J. C. WILKINS.
SANITARY POULTRY ROOST.
APPLICATION FILED OCT. 16, 1916.

1,233,533.

Patented July 17, 1917.

WITNESSES:
John S. Schrott
J. M. Bena

INVENTOR
Jess C. Wilkins
BY
William P. Jones
ATTORNEY

UNITED STATES PATENT OFFICE.

JESS C. WILKINS, OF FOUNTAIN, COLORADO.

SANITARY POULTRY-ROOST.

1,233,533.

Specification of Letters Patent.

Patented July 17, 1917.

Application filed October 16, 1916. Serial No. 125,852.

*To all whom it may concern:*

Be it known that I, JESS C. WILKINS, a citizen of the United States, residing at Fountain, in the county of El Paso and State of Colorado, have invented certain new and useful Improvements in Sanitary Poultry-Roosts, of which the following is a specification.

My invention relates to sanitary poultry roosts, and the principal object thereof is to provide a roost which will keep poultry free from all vermin.

A further object contemplated by the invention is the provision of a roost having channeled perches which are yieldably and adjustably connected to the main frame so as to permit of their ready removal and replacement; to allow positioning of the perches in any desired relation to each other; and to provide for utilizing the yieldable connections as closures for the channels of the perches.

A still further object of the invention is to provide a roost, which in its entirety, is extremely simple in construction and arrangement, and which accordingly may be manufactured and marketed very economically.

To the accomplishment of the recited objects, and others coördinate therewith, the preferred embodiment of my invention resides in the construction and arrangement hereinafter described, shown in the accompanying drawings, and embraced within the scope of the appended claims.

Figure 1:
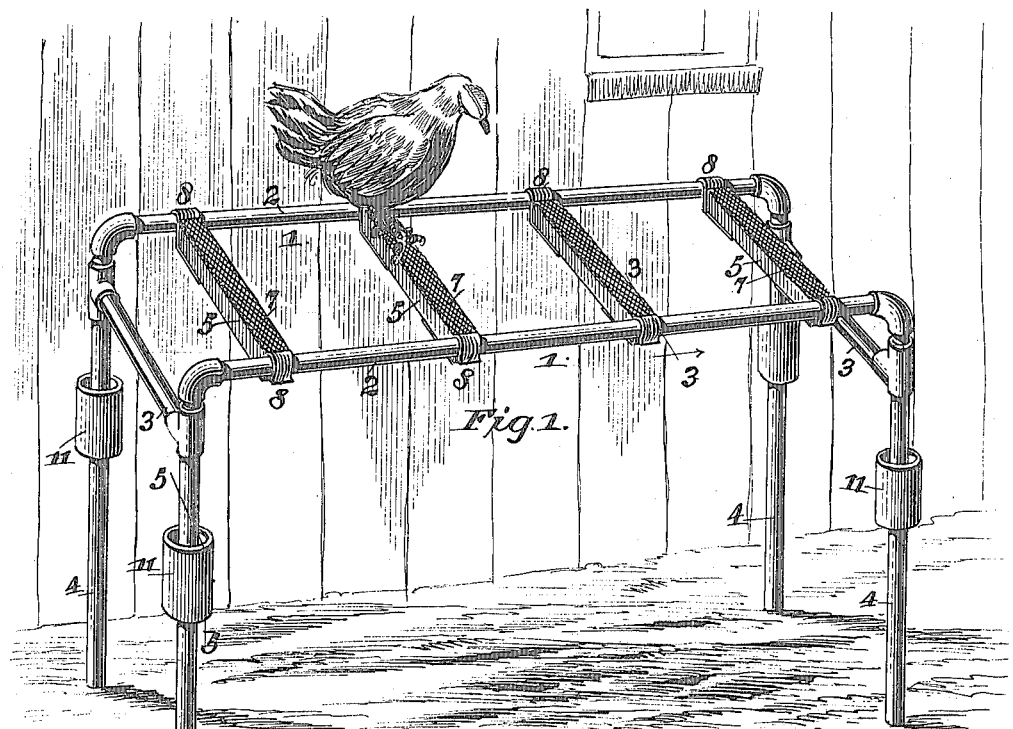
Figure 1 is a perspective view of the roost embodying my invention.
Figure 2:
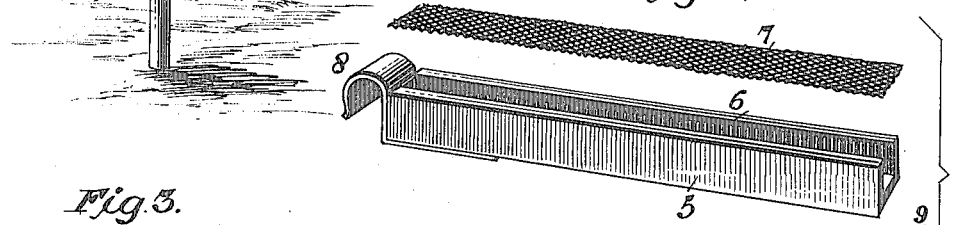
Fig. 2 is a detail perspective view of one of the perches removed from the frame.

Referring more particularly to the drawings for a detailed description of my invention, the numeral 1 designates generally a table-like structure or frame, comprising upper side bars 2, end bars 3 and legs 4. Disposed transversely between the side-bars in spaced relation are a plurality of perches 5. Each perch is longitudinally channeled, as at 6, for the reception of absorbent material, or the like, containing suitable anti-vermin substance or liquid, and a fine mesh screen 7 is secured to the top of the perch, as at 7', and bridges the channel 6 so as to confine the said substance or liquid within the channel and at the same time allow it to permeate through the meshes and destroy the vermin on the poultry.

Figures 3, 5:
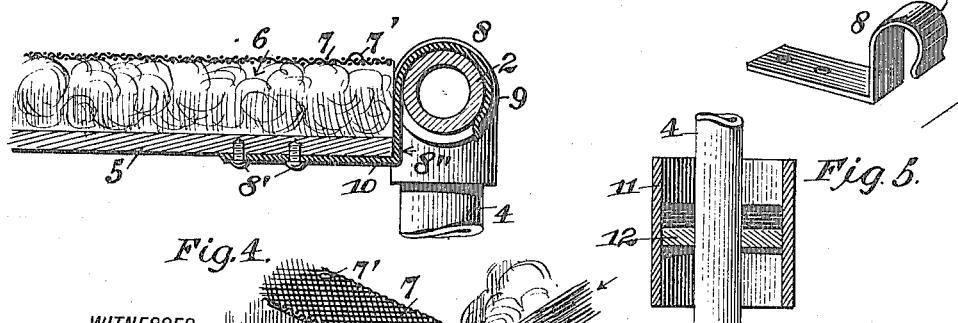
Fig. 3 is a vertical sectional view of one of the traps on the legs of the frame.
Figure 4:
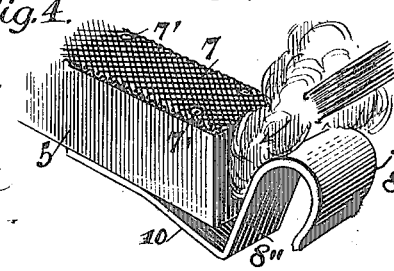
Fig. 4 is a fragmentary view of the connection between the perch and the side-bar of the frame.

The connection between the ends of the perches and the side-bars of the frame is formed by a spring clip 8 having one terminal secured to the under side of the perch at 8', from which point it extends outwardly to the end of the perch and is then bent upwardly at right angles, as at 8'', finally being fashioned into a loop 9 which engages the side bar 2. This construction is clearly exhibited in Fig. 4 of the drawings. At the point where the metal of which the clip is made is deflected upwardly, I form an offset 10, which normally has a tendency to constrain the loop portion 9 of the clip outwardly with respect to the end of the perch, leaving the open end of the channel exposed to permit the introduction of absorbent material saturated with anti-vermin substance. This, it will be understood, is done while the perch is removed from the side members. The length of the perch and the distance between the side members are so proportioned that when the perch is replaced the portion 8'' of the clip will be caused to close the open end of the channel, as clearly shown in Fig. 3. Furthermore, the off-set 10 serves to impart a slight resiliency to the perch which manifestly relieves the fowl from sudden impact when lighting upon the perch. Another advantage accruing to this specific connection is that each perch may be adjusted in any desired position relative the side-bars of the frame by simply exerting a little force transversely of the perch for the purpose of overcoming the friction.

As an additional precaution against vermin I provide integral cups or containers upon each leg 4. As will be seen upon inspection of Fig. 3, a small cylinder open at both ends and having a central partition is disposed about midway of the vertical extent of each leg, the cylinder being designated by 11 and the partition by 12. Any suitable vermin destroying substance or liquid may be introduced upon opposite sides of the partition into the spaces thus formed and effectively prevent the passage of vermin in either vertical direction.

It should be understood that in its broader aspects my invention comprehends the employment not only of the various means described, but of equivalent means for performing the recited functions. It is desired to reserve the right to effect such modifications and variations as may come fairly within the scope of the appended claims.

What is claimed is:

1. In a poultry roost, the combination of a frame provided with side members, a perch having a channel extending from end to end, a reticulated cover secured to the top of the perch, and connections between the member and perch, each connection serving as a closure for the end of the channel when the perch is positioned on the side members, but being formed with an off-set which has a tendency to constrain the connection away from the open end of the channel when the perch is dismounted from the side members.

2. In a poultry roost, the combination with a frame, of a perch having a channel extending from end to end, a perforated cover secured to the top of the perch, and spring clips carried by the perch normally removed from the open ends thereof, but adapted when mounted on said frame to close the ends of the perch.

3. In a poultry roost, the combination with a frame, of a perch having a channel extending throughout its length, a perforated cover for said channel, and connections between the frame and the perch and fixed permanently to the latter, said connections leaving the open ends of the channel exposed when disengaged with respect to said frame, and adapted to close said ends when positioned on said frame.

In testimony whereof I hereunto affix my signature in the presence of two witnesses.

JESS C. WILKINS.

Witnesses:
A. B. JONES,
A. C. PEVISTORFF.